United States Patent
Yoshimura et al.

(10) Patent No.: US 10,096,979 B2
(45) Date of Patent: Oct. 9, 2018

(54) GAS-INSULATED ELECTRICAL DEVICE HAVING AN INSULATION COVERING FILM

(71) Applicant: Mitsubishi Electric Corporation, Chiyoda-ku (JP)

(72) Inventors: Manabu Yoshimura, Chiyoda-ku (JP); Takashi Miyamoto, Chiyoda-ku (JP); Soichiro Kainaga, Chiyoda-ku (JP); Hitoshi Sadakuni, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/036,507

(22) PCT Filed: Jun. 3, 2014

(86) PCT No.: PCT/JP2014/064699
§ 371 (c)(1),
(2) Date: May 13, 2016

(87) PCT Pub. No.: WO2015/111236
PCT Pub. Date: Jul. 30, 2015

(65) Prior Publication Data
US 2016/0268784 A1    Sep. 15, 2016

(30) Foreign Application Priority Data
Jan. 22, 2014    (JP) .................. 2014-009103

(51) Int. Cl.
*H02B 13/045* (2006.01)
*H02G 5/06* (2006.01)
*H02B 13/055* (2006.01)

(52) U.S. Cl.
CPC ........... *H02B 13/045* (2013.01); *H02G 5/065* (2013.01); *H02B 13/055* (2013.01)

(58) Field of Classification Search
CPC ..... H02B 13/045; H02B 13/055; H02G 5/065
(Continued)

(56) References Cited

U.S. PATENT DOCUMENTS 3,856,978 A * 12/1974 Sletten ................. H01B 9/0672
                                                                  174/14 R
4,564,721 A *  1/1986 Ishikawa ................ H02G 5/065
                                                                  134/42
(Continued)

FOREIGN PATENT DOCUMENTS

EP    0 196 348 A1    10/1986
JP    62-196010 A      8/1987
(Continued)

OTHER PUBLICATIONS

Taidenretsu no rei (An example of triboelectric series), (Recommendations for Requirements for Avoiding Electrostatic Hazards in Industry, 1988, Technical Recommendation of Research Institute of Industrial Safety, Japan), (with English translation), 2 pages.
(Continued)

*Primary Examiner* — Zachary M Pape
(74) *Attorney, Agent, or Firm* — Oblon, McClelland, Maier & Neustadt, L.L.P.

(57) ABSTRACT

A gas-insulated electrical device includes a covering film covering an inner surface of a ground tank filled with an insulation gas. The covering film is formed of an insulation dielectric covering film that becomes more positively charged than metals in a triboelectric series, and becomes positively charged upon contact with metal foreign matter. At the same time, the metal foreign matter becomes negatively charged upon contact with the covering film. In a case where the high-voltage conductor is charged to a negative polarity, a Coulomb's force acts on the metal foreign matter in contact with the covering film in a direction away from
(Continued)

the high-voltage conductor. The metal foreign matter in the ground tank is thus suppressed from floating.

8 Claims, 6 Drawing Sheets

(58) Field of Classification Search
USPC .................. 361/604, 612, 618; 174/10, 14 R
See application file for complete search history.

(56) References Cited

U.S. PATENT DOCUMENTS

| | | | |
|---|---|---|---|
| 4,667,061 A | | 5/1987 | Ishikawa et al. |
| 9,890,296 B2 * | | 2/2018 | Matsuzaki ............ C09D 163/00 |
| 2012/0281332 A1 * | | 11/2012 | Kato ...................... H02G 5/065 |
| | | | 361/226 |

FOREIGN PATENT DOCUMENTS

| JP | 8-149667 A | | 6/1996 |
|---|---|---|---|
| JP | 8-265927 A | | 10/1996 |
| JP | 2000-184563 A | | 6/2000 |
| JP | 2000166065 A | * | 6/2000 |
| JP | 2002-315118 A | | 10/2002 |
| JP | 2008-35625 A | | 2/2008 |
| JP | 2009-284651 A | | 12/2009 |

OTHER PUBLICATIONS

Department of Defense Handbook, Electrostatic Discharge Protective Packaging, MIL-HDBK-773A, Jun. 30, 2005, 42 pages.
Sen'i To Kogyo, "Metal Fiber and its Application," The Society of Fiber Science and Technology, vol. 22, No. 7S, 1966, (with English translation), 23 pages.
International Search Report dated Aug. 26, 2014 in PCT/JP2014/064699 filed Jun. 3, 2014.
Extended European Search Report dated Jul. 21, 2017 in Patent Application No. 14880096.4.

* cited by examiner

GAS-INSULATED ELECTRICAL DEVICE HAVING AN INSULATION COVERING FILM

TECHNICAL FIELD

The present invention relates to a gas-insulated electrical device including a high-voltage conductor and electrical equipment, such as switchgear and a current transformer, stored in an airtight container, and configured so as to insulate components and the high-voltage conductor from the airtight container by filling the airtight container with an insulation gas.

BACKGROUND ART

A gas-insulated electrical device includes a cylindrical ground tank and a current-carrying cylindrical high-voltage conductor disposed coaxially in the ground tank, and the ground tank is hermetically filled with an insulation gas represented by a chief insulation medium, such as a sulfur hexafluoride gas, dry air, nitrogen, a carbon dioxide gas, $CF_4$, $CHI_3$, $C_2F_6$, and $C_3F_8$, or a mixed gas obtained by combining the foregoing gases. The gas-insulated electrical device configured as above is chiefly used as a high-voltage device. In particular, a sulfur hexafluoride gas has a dielectric strength about three times higher than that of air. Accordingly, when a sulfur hexafluoride gas is employed, a distance between a high voltage portion and a ground electrode can be shorter and hence a size of the device can be reduced.

Normally, a gas used as an insulation medium in the gas-insulated device is pressurized to or above an atmospheric pressure in order to enhance insulation performance and breaking performance. Therefore, in order to hermetically seal the gas and maintain an equal insulation distance, the gas-insulated device adopts a structure in which a tank forming the airtight container described above is of a cylindrical shape and a high-voltage conductor of also a cylindrical shape is disposed coaxially with the tank.

While a sulfur hexafluoride gas has a very high dielectric strength, it should be noted that insulation performance deteriorates under an inhomogeneous electric field. In the case of switchgear, metal foreign matter in the order of millimeters may possibly be generated from a sliding portion where metal is joined to metal and a contact portion where conductors, such as a breaker and a disconnector, are in contact with each other. The metal foreign matter thus generated first rests on a bottom surface in the tank forming the airtight container. The metal foreign matter, however, becomes electrically charged due to an action, such as electrostatic induction, and starts to move according to a potential gradient between the tank and the high-voltage conductor while the device is in operation. In the beginning, the metal foreign matter that has been lying flat stands up. In the case of a DC device, in particular, the metal foreign matter standing up starts to float and moves so as to eventually come in close proximity to the high-voltage conductor or make contact with the high-voltage conductor. The metal foreign matter accumulates while behaving in the vicinity of the conductor particularly when the high-voltage conductor is charged to a negative polarity. In the coaxial cylindrical shape, the electric field becomes highest in the vicinity of the high-voltage conductor. Hence, the metal foreign matter becomes extremely inhomogeneous and the electric field becomes high in the vicinity of the metal foreign matter. When an overvoltage, such as a lightning surge, flows into the device in such a state, a ground fault may possibly occur.

An effective countermeasure against a decrease of a withstand voltage in the presence of the metal foreign matter is a tank inner surface structure, by which incoming metal foreign matter is forced to rest on the tank bottom surface as much as possible to suppress the foreign matter from floating. More specifically, this is a method to enhance withstand voltage performance against foreign matter by providing an insulation material of at least 0.2 mm thick to the inner surface of a tank wall (see, for example, PTL 1).

Also, an amount of charge of the foreign matter is suppressed by providing a non-linear resistance film on an inner surface of the tank to suppress the foreign matter from floating (see, for example, PTL 2).

CITATION LIST

Patent Literatures

PTL 1: JP-A-08-149667
PTL 2: JP-A-2009-284651

SUMMARY OF INVENTION

Technical Problem

In the gas-insulated electrical device in the related art described in PTL 1, an insulation material is provided to the inner surface of the tank made of metal as a protection structure against foreign matter. By providing the insulation material, a direct supply of charges can be avoided in comparison with a structure uncovered with an insulation material. Hence, a floating electric field can be raised above the foreign matter lying flat by suppressing the foreign matter from becoming electrically charged. However, an extremely high electric field develops in a fine gap formed at a contact portion of the foreign matter and the insulation material and a partial discharge takes place. A Coulomb's force therefore acts on the metal foreign matter due to electrification by discharge, which allows the metal foreign matter to start to float.

In the protection structure against the foreign matter in the gas-insulated electrical device described in PTL 2, a non-linear resistance film having field-dependent resistivity is provided on the tank surface. A characteristic of the non-linear resistance film against the foreign matter is a structure that can ease a high electric field developed in the fine gap in comparison with the insulation cover film described above. Hence, the non-linear resistance film can raise a floating electric field higher than does the insulation cover film by suppressing the foreign matter from becoming electrically charged. The characteristic of the non-linear resistance film depends on an electric field, and the non-linear resistance film can exert an effect when the non-linear resistance film has a distribution characteristic appropriate for a resistance distribution such that resistivity is reduced by the electric field more than by an electric field during normal operation in the absence of foreign matter.

However, the electric field acting on the tank bottom surface of the gas-insulated electric device varies from region to region in the gas-insulated electric device. When an electric field having a unique resistance distribution is generated, the non-linear resistance film may exert an electric field easing effect in one region whereas the non-linear resistance film may fail to exert the electric field easing effect in another region under the action of a different electric field or when the non-linear resistance film is applied to a device of a different voltage class.

Materials that become more negatively charged than metals are used for the insulation material of PTL 1 and the non-linear resistance film of PTL 2 provided in the tank.

The invention was devised to solve the problems discussed above and has an object to provide a gas-insulated electrical device which is a DC device and capable of suppressing metal foreign matter in an airtight container from coming in close proximity to a conductor by suppressing the foreign matter from floating when the conductor is charged to a negative polarity.

Solution to Problem

A gas-insulated electrical device includes a conductor to which a high voltage is applied, an airtight container made of metal to enclose the conductor and filled with an insulation gas, and a covering film covering an inner surface of the airtight container. The covering film is made of a material that becomes more positively charged than metals in a triboelectric series. The covering film becomes positively charged upon contact with metal foreign matter in the airtight container whereas the metal foreign matter becomes negatively charged upon contact with the covering film.

Effects of Invention

According to the gas-insulated electrical device of the invention, the covering film made of a material that becomes positively charged upon contact with metals is provided to the inner surface of the airtight container. Owing to this configuration, when metal foreign matter generated in the device comes into contact with a bottom surface of the airtight container, the covering film becomes positively charged and conversely the metal foreign matter becomes negatively charged. Hence, while a DC of a negative polarity is applied to the high-voltage conductor, the metal foreign matter can be suppressed from floating and the metal foreign matter can be also suppressed from coming in close proximity to the high-voltage conductor. Consequently, insulation reliability of the gas-insulated electrical device can be enhanced.

The foregoing and other objects, features, aspects, and advantages of the present invention will become more apparent from the following detailed description of the present invention when taken in conjunction with the accompanying drawings.

DESCRIPTION OF EMBODIMENTS

First Embodiment

Figure 1:
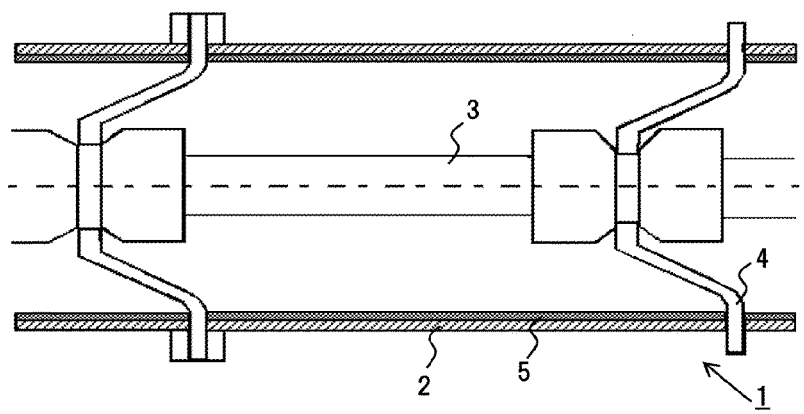
FIG. 1 is a sectional side view of a gas-insulated electrical device according to a first embodiment of the invention.
Figures 2A, 2B:
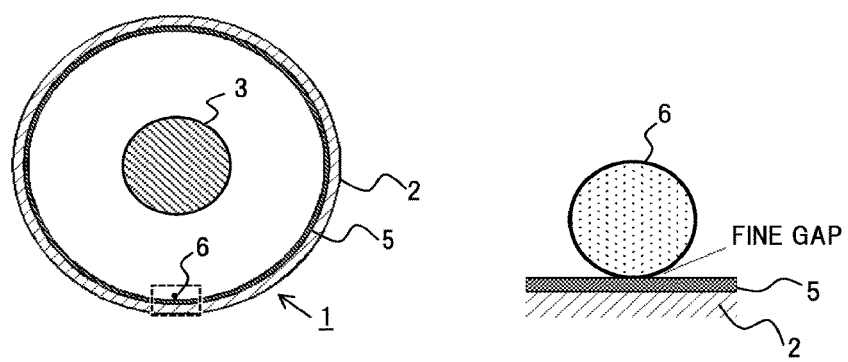
FIGS. 2A and 2B are views of the gas-insulated electrical device according to the first embodiment of the invention, FIG. 2A being a sectional view showing metal foreign matter resting on a bottom surface of a ground tank, and FIG. 2B being an enlarged sectional view of the metal foreign matter.
Figure 3:
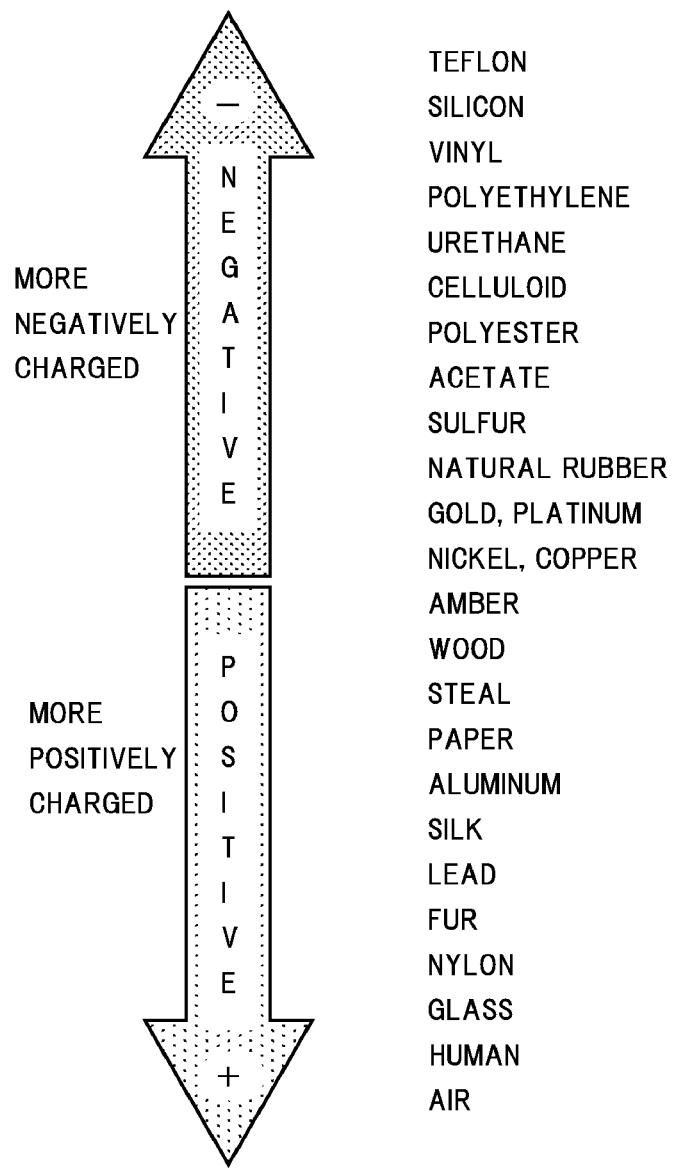
FIG. 3 is a view showing a triboelectric series of various materials necessary to describe the first embodiment of the invention.

Hereinafter, a gas-insulated electrical device according to a first embodiment of the invention will be described with reference to FIG. 1 through FIG. 7. A description will be given by labeling same or equivalent members and portions with same reference numerals in respective drawings. FIG. 1 is a sectional side view of a gas-insulated electrical device 1 according to the first embodiment of the invention taken along an axial direction. FIG. 2A is a sectional view of the gas-insulated electrical device 1 in a direction perpendicular to the axial direction. FIG. 2B is an enlarged sectional view of metal foreign matter 6 on a bottom surface of a ground tank 2 of FIG. 2A. FIG. 3 is a view showing a triboelectric series of various materials indicating which becomes more electrically charged than which.

The gas-insulated electrical device 1 according to the first embodiment of the invention includes a cylindrical ground tank 2 made of metal, which is an airtight container filled with an insulation gas and also a pressure container, a high-voltage conductor (conductor) 3 electrically connected to components (not shown), such as a breaker and a disconnector, and disposed on a central axis line of the ground tank (airtight container) 2, and insulation spacers 4 which are solid insulators supporting the high-voltage conductor 3. An insulation covering film 5 that becomes more positively charged than metals is provided on an inner surface of the ground tank 2. An insulation gas layer is present between the high-voltage conductor 3 and the covering film 5.

The insulation covering film 5 is a dielectric covering film made of positively-charging resin which gives rise to positive electrification upon contact with a metal material. Materials of the covering film 5 can be, for example, rayon, nylon, and polymethylmethacrylate. In the triboelectric series shown in FIG. 3, rayon and polymethylmethacrylate are at the position of fur and these are materials that become more positively charged.

The covering film 5 made of positively-charging resin can be provided by more than one method. For example, in a case where the covering film 5 made of synthetic resin is obtained, the covering film 5 is provided by forming a thin-film sheet of synthetic resin and by laminating the thin-film sheet along the inner surface of the ground tank 2.

Alternatively, the covering film 5 may be provided by preparing a woven fabric of synthetic resin fibers and laminating the woven fabric along the inner surface of the ground tank 2.

Further, in a case where resin making the covering film 5 is thermoplastic resin, resin is turned to gel by heating at or above a certain temperature and the covering film 5 is molded so as to conform to an inner surface shape of the ground tank 2. In a case where the covering film 5 is provided to the ground tank 2 made of metal, the covering film 5 made of thermoplastic resin can be provided because an allowable temperature is higher than in a case where the covering film 5 is provided on the insulation spacers 4 made of resin.

As still another method of providing the covering film 5, powdery particles having a particle size of several μm to several tens μm are mixed with a liquid of binder resin, and a thin film of the mixture formed by spray coating, brush coating, baking finishing, or dip painting is allowed to set. In this case, however, because a material different from positively-charging resin is mixed as a material making the covering film 5, the positively-charging resin has to account for a greater volume percent of the mixture than the other mixed materials.

Among materials that become more positively charged, materials applicable to the gas-insulated electrical device 1 have to satisfy the following conditions. That is, the materials are insulators, do not produce a cracked gas, undergo performance deterioration only slightly with operation time, and maintain performance in a thermal environment at approximately 100 degrees.

A physical phenomenon occurring in the gas-insulated electrical device 1 according to the first embodiment of the invention will now be described. Most of parts forming the gas-insulated electrical device 1 are put together in a clean room in a factory and the assembly is transported to a site. However, some of the parts are put together at the site by reason of the transportation limit. Accordingly, the metal foreign matter 6 may possibly come into the gas-insulated electrical device 1 during the on-site assembling work. Most of the metal foreign matter 6 is removed at an inspection step. It is, however, difficult to find the metal foreign matter 6 of 3 mm or less in length and 0.2 mm or less in thickness. The metal foreign matter 6 of such a size may be overlooked and left in the ground tank 2.

Fresh metal foreign matter 6 falls down to the bottom surface in the ground tank 2 due to gravity and lies flat. Metal forming the ground tank 2 directly makes contact with the metal foreign matter 6 in a case where the covering film 5 is not provided to the inner surface of the ground tank 2, and in an operation state during which a voltage is applied to the high-voltage conductor 3, a phenomenon induced by electrostatic induction acts on the metal foreign matter 6. Charges are thus supplied from the ground tank 2 to the metal foreign matter 6 regardless of the polarities and the metal material 6 becomes electrically charged. On the contrary, in a case as is shown in FIG. 2A where the insulation covering film 5 is provided to the inner surface of the ground tank 2, the metal foreign matter 6 becomes electrically charged with ions generated by a discharge due to a fine gap formed in the vicinity of a contact portion of the metal foreign matter 6 and the covering film 5 as shown in FIG. 2B. An electric field is developed between the high-voltage conductor 3 and the ground tank 2 in the ground tank 2 being charged. Hence, a Coulomb's force corresponding to an amount of charge acts on the electrically charged metal foreign matter 6. The metal foreign matter 6 that has been lying flat thus stands up and floats toward the high-voltage conductor 3. Eventually, the metal foreign matter 6 comes in close proximity to the high-voltage conductor 3 and makes contact with the high-voltage conductor 3.

A phenomenon relating to the metal foreign matter 6 since it starts to float until it reaches the high-voltage conductor 3 is a phenomenon that occurs when an electric field on the bottom surface of the ground tank 2 exceeds a floating electric field, and this phenomenon occurs when the metal foreign matter 6 becomes negatively charged in a case where the high-voltage conductor 3 is charged to a positive polarity or conversely when the metal foreign matter 6 becomes positively charged in a case where the high-voltage conductor 3 is charged to a negative polarity.

In the case of negative polarity charging by which a negative polarity is applied to the high-voltage conductor 3, the metal foreign matter 6 remains in a state in which the metal foreign matter 6 accumulates in the vicinity of the high-voltage conductor 3.

The metal foreign matter 6 takes various shapes and a most harmful shape from the viewpoint of insulation is a needle shape. The needle-shaped foreign matter accumulates with its longitudinal direction aligned in a radial direction along an orientation of the electric field. Hence, the electric field becomes high at the tip end of the metal foreign matter 6 and a partial discharge takes place. When an overvoltage, such as a lightning surge, flows into the device in the state as above, a ground fault may possibly occur.

On the other hand, in the case of positive polarity charging by which a positive polarity is applied to the high-voltage conductor 3, the metal foreign matter 6 does not rest on the high-voltage conductor 3 as does in the case of the negative polarity charging, and moves within the container forming the ground tank 2 or floats between the high-voltage conductor 3 and the ground tank 2. Hence, a risk of insulation ground fault is low in comparison with the negative polarity charging.

The above has described the phenomenon by which the metal foreign matter 6 that has been lying flat in the ground tank 2 stands up and floats. In the following, the gas-insulated electrical device 1 according to the first embodiment of the invention configured so as to hardly let the metal foreign matter 6 float will be described.

Figure 4:
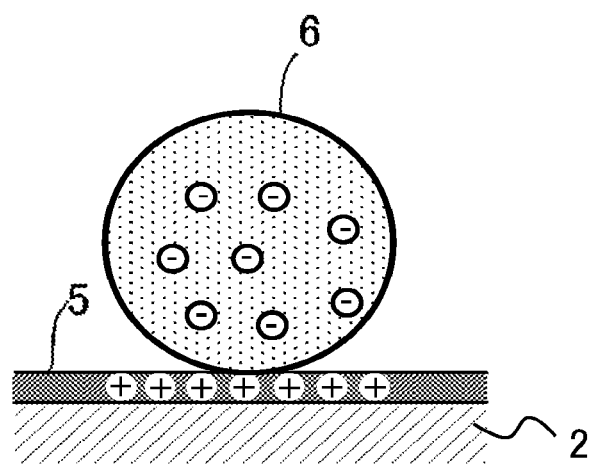
FIG. 4 is a sectional view showing in which manner the metal foreign matter receives charges upon contact with the bottom surface of the ground tank of the gas-insulated electrical device according to the first embodiment of the invention.

FIG. 4 is a sectional view showing in which manner the metal foreign matter 6 receives charges when making contact with the bottom surface of the ground tank 2 of the gas-insulated electrical device 1 of the first embodiment. In the first embodiment, the metal foreign matter 6 fell down and lying flat on the container bottom surface of the ground tank is made of metal materials of the members forming the gas-insulated electrical device 1. Hence, by providing the covering film 5 made of positively-charging resin that becomes more positively charged than metals as indicated in the triboelectric series of FIG. 3 on the inner surface of the ground tank 2, the metal foreign matter 6 receives negative charges upon contact with the covering film 5 as shown in FIG. 4 and changes to a negatively charged state. At the same time, the covering film 5 receives positive charges upon contact with the metal foreign matter 6 and changes to a positively charged state.

Figure 5:
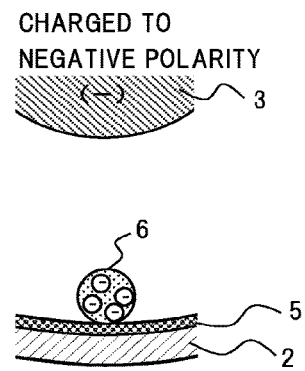
FIG. 5 is a sectional view of the gas-insulated electrical device according to the first embodiment of the invention when the metal foreign matter making contact with the bottom surface of the ground tank becomes negatively charged and a high-voltage conductor is charged to a negative polarity.

FIG. 5 is a view showing a cross section of a major portion in the gas-insulated electrical device 1. More specifically, FIG. 5 is a sectional view schematically showing a state in which the metal foreign matter 6 in contact with the bottom surface of the ground tank 2 becomes negatively charged and the high-voltage conductor 3 is charged to the negative polarity.

In a case where the negative polarity is applied to the high-voltage conductor 3 as is shown in FIG. 5, a Coulomb's force in a direction away from the high-voltage conductor 3 acts on the negatively-charged metal foreign matter 6. Hence, the metal foreign matter 6 does not float up from the bottom surface of the ground tank 2. Should a partial discharge take place in the vicinity where the metal foreign matter 6 and the covering film 5 are in contact with each other, because the metal foreign matter 6 is negatively charged from the start, a possibility that the metal foreign matter 6 becomes positively charged is low and an amount of the charge is small in comparison with the structure in the related art. Hence, a condition to be satisfied in order to let the metal foreign matter 6 float is to develop a larger electric field by the charging.

Figure 6:
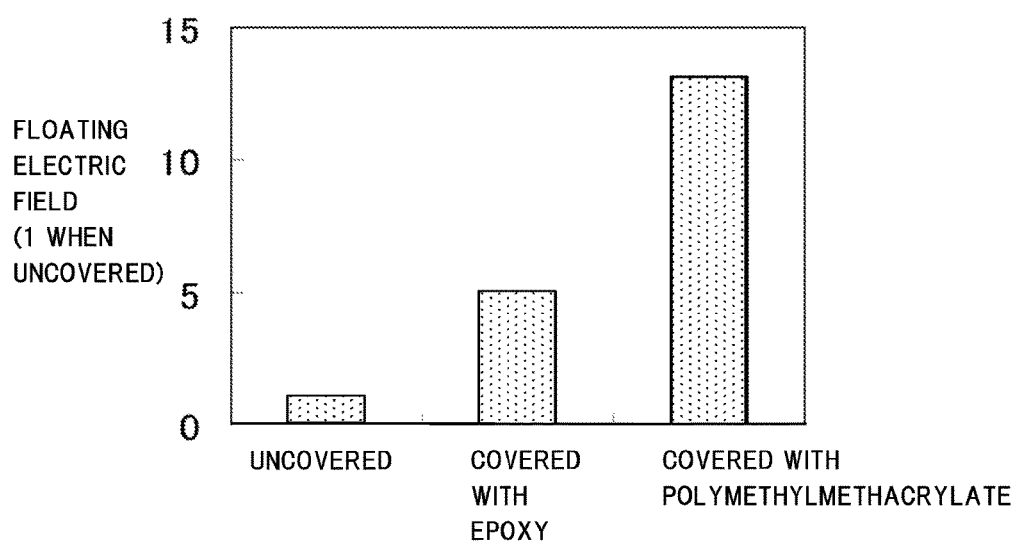
FIG. 6 is a view showing floating voltages in the gas-insulated electrical device according to the first embodiment of the invention in the absence of a covering film on the bottom surface of the ground tank and in the presence of a covering film made of epoxy resin that becomes negatively charged and a covering film made of polymethylmethacrylate resin which is a material that becomes positively charged.

FIG. 6 shows a case where the phenomenon described above is verified by a test. More specifically, FIG. 6 shows a result when the covering film 5 made of epoxy resin that becomes negatively charged and the covering film 5 made of polymethylmethacrylate resin that becomes positively charged were provided separately and a floating electric field was obtained by applying a negative polarity to the high-voltage conductor 3. In FIG. 6, the ordinate is used for the floating electric field and the floating electric field in the absence of the covering film 5 is normalized to 1.

In the triboelectric series shown in FIG. 3, epoxy resin used as a comparative subject is close to natural rubber and, as has been described above, polymethylmethacrylate resin corresponds to fur in the triboelectric series. That is, polymethylmethacrylate resin is a substance that becomes more positively charged than epoxy resin. It can be understood from FIG. 6 that the floating electric field is apparently enhanced by making the covering film 5 out of positively-charging resin.

Figure 7:
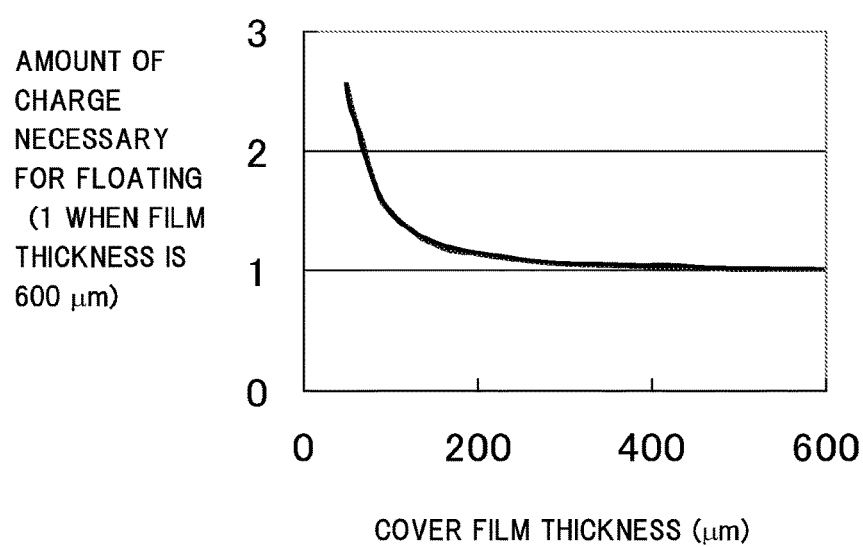
FIG. 7 is a view showing an electric field necessary for foreign matter to float with respect to a film thickness of the covering film provided to an inner surface of the ground tank according to the first embodiment of the invention.

FIG. 7 is a view showing dependency on a film thickness of the covering film 5 of an electric field (floating electric field) necessary for the metal foreign matter 6 to float. The floating electric field when a film thickness of the covering film 5 is 600 μm is normalized to 1. It is understood from FIG. 7 that an electric field necessary for the foreign matter to float becomes smaller as the film thickness of the covering film 5 is increased, which is ascribed to a phenomenon as follows. That is, a force making the metal foreign matter 6 move toward the high-voltage conductor 3 is a Coulomb's force by an electric field developed by the charging. In addition, a force by which the metal foreign matter 6 is attracted to the ground tank 2 in a direction opposite to the floating direction from the ground tank 2 also acts on the metal foreign matter 6 by an imaging force. The imaging force is inversely proportional to the square of a distance between the metal foreign matter 6 and the ground electrode (ground tank 2). Hence, the imaging force acting on the metal foreign matter 6 becomes smaller as the film thickness of the covering film 5 increases. Accordingly, given that an amount of the charge by a discharge is constant, then the metal foreign matter 6 floats even when an electric field developed by the charging is small. As is shown in FIG. 7, an electric field necessary for the metal foreign matter 6 to float becomes noticeably large when the film thickness is at or less than 200 μm. It is therefore understood that the film thickness of the covering film 5 is preferably 200 μm or less.

Hence, when the covering film 5 made of positively-charging resin is provided to the inner surface of the ground tank 2, the metal foreign matter 6 becomes negatively charged upon contact with the positively-charging resin and a Coulomb's force acts in a direction away from the high-voltage conductor 3 of the negative polarity. Accordingly, the metal foreign matter 6 is restricted from floating up from the bottom surface of the ground tank 2. Hence, the floating electric field is enhanced and the metal foreign matter 6 is suppressed from coming in close proximity to the high-voltage conductor 3. Consequently, the gas-insulated electrical device 1 achieving high reliability can be obtained.

Second Embodiment

A structure of a gas-insulated electric device 1 includes a mechanism with a metal-to-metal contact, such as a contact of a breaker portion or a disconnector portion to a high-voltage conductor 3. Fine particles generated by such a physical metal-to-metal contact form metal foreign matter 6. Although an absolute amount is small, copper and silver are used in a contact portion of the high-voltage conductor 3. The metal foreign matter 6 therefore contains a material, such as copper and silver. Also, because ground tanks 2 are fastened to each other with bolts, metal pieces, such as burrs left on bolt surfaces and bolt through-holes, are thought to form the metal foreign matter 6 in the ground tanks 2. The metal foreign matter 6 formed from the bolts fastening the ground tanks 2 is chiefly made of iron.

As is indicated in the triboelectric series of FIG. 3, it is understood that metals made of different materials vary in readiness to become positively or negatively charged. By taking such variance into consideration, a covering film 5 is made of a material that becomes more positively charged than metal materials used in a zone (a structural object surrounded by the insulation spaces 4 of FIG. 1) in which the metal foreign matter 6 is physically generated. When configured in this manner, the metal foreign matter 6 that is inevitably generated becomes negatively charged upon contact with the covering film 5 and a Coulomb's force acts in a direction away from the high-voltage conductor 3 of a negative polarity. Accordingly, the metal foreign matter 6 is suppressed from floating up from a bottom surface of the ground tank 2. Hence, a floating voltage of the metal foreign matter 6 is enhanced. Consequently, a gas-insulated electric device 1 achieving high reliability can be obtained.

Third Embodiment

The second embodiment above has described a case where the metal foreign matter 6 generated in an airtight space divided by the two insulation spacers 4 is made of metal materials, such as copper, silver, and iron. A third embodiment will describe a case where metal foreign matter 6 is made of aluminum which has a lighter specific gravity and becomes more positively charged than the metal materials specified in the second embodiment above in the triboelectric series. As has been described, the metal foreign matter 6 is made of a different material depending on a place where the metal foreign matter 6 is generated. The metal foreign matter 6 generated from a high-voltage conductor 3 is chiefly made of aluminum.

As is indicated in the triboelectric series of FIG. 3, aluminum becomes more negatively charged than the other metals, namely, copper, silver, and iron. Hence, in a case where the metal foreign matter 6 is made of aluminum, the metal foreign matter 6 becomes negatively charged without fail upon contact with a covering film 5 and a Coulomb's force acts in a direction away from the high-voltage conductor 3 of a negative polarity. The metal foreign matter 6 is thus suppressed from floating up from a bottom surface of a ground tank 2. Hence, when the metal foreign matter 6 is made of aluminum, a floating voltage is enhanced. Consequently, a gas-insulated electrical device 1 achieving high reliability can be obtained.

Fourth Embodiment

As has been described in the first embodiment above, when a covering film 5 is absent, charges are given to a ground tank 2 due to electrostatic induction from a bottom surface of the ground tank 2. In the case of DC charging, charges of an opposite polarity to a high-voltage conductor 3 are given. Hence, when the high-voltage conductor 3 is of a negative polarity, positive charges are given to metal foreign matter 6. Even in the presence of the covering film 5, electrostatic induction cannot be suppressed when volume resistivity of an insulation material is not adequate. Hence, the metal foreign matter 6 becomes electrically charged and the metal foreign matter 6 floats.

The invention has described in the first through third embodiments above that the covering film 5 is provided in the ground tank 2. However, suppression of a leak current via the covering film 5 has not been described. In a fourth embodiment, attention is paid to volume resistivity indicating insulation properties of the covering film 5 and the volume resistivity of an insulation material forming the covering film 5 is set to a value at which a leak current from the bottom surface of the ground tank 2 can be controlled to be small. By making the volume resistivity of the covering film 5 adequate so as to control a leak current flowing via the covering film 5 to be small, charges given to the metal foreign matter 6 in the ground tank 2 can be suppressed. Consequently, the metal foreign matter 6 becomes less electrically charged.

Herein, a material having volume resistivity (definition of insulators) of $10^8$ Ωm or higher is selected as an insulation material forming the covering film 5. It is, however, more preferable to select a material having volume resistivity of $10^{10}$ Ωm or higher. By forming the covering film 5 from the materials specified as above, charges given from the bottom surface of the ground tank 2 can be reduced. In addition, the metal foreign matter 6 becomes negatively charged upon contact with the covering film 5 and a Coulomb's force acts in a direction away from the high-voltage conductor 3 of a negative polarity. Owing to the effects as above, the metal foreign matter 6 is suppressed from floating up from the bottom surface of the ground tank 2 and a floating electric field is enhanced. Consequently, a gas-insulated electrical device 1 achieving high reliability can be obtained.

Fifth Embodiment

The first through fourth embodiments above have described the coating on the inner surface of the ground tank 2. An effect when the coating is applied to the high-voltage conductor 3 in the structural object described in the first embodiment above will be described in the following. In the case of DC charging, metal foreign matter 6 may possibly float up from a bottom surface of a ground tank 2 due to mechanical vibrations and float toward a high-voltage conductor 3 even when the structure on the side of the ground tank 2 exerts the float suppression effect. Unless any treatment is applied to the high-voltage conductor 3, the metal foreign matter 6 floating toward the high-voltage conductor 3 behaves as described above in the vicinity of the high-voltage conductor 3, that is, the metal foreign matter 6 accumulates in the vicinity of the high-voltage conductor 3 while moving with its longitudinal direction pointing perpendicularly to the high-voltage conductor 3. Hence, an electric field becomes extremely high at the tip end of the metal foreign matter 6 and there is a risk that insulation performance deteriorates in comparison with a case where the metal foreign matter 6 is absent.

Figure 8:
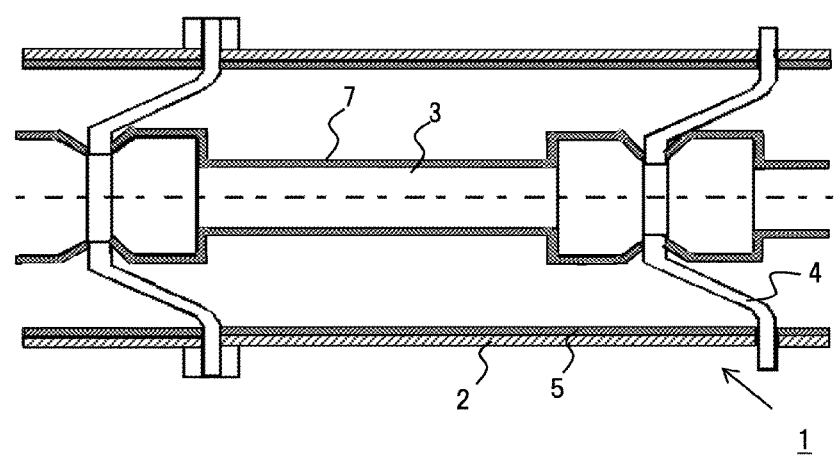
FIG. 8 is a sectional side view of a gas-insulated electrical device according to a fifth embodiment of the invention.

Under such a circumstance, as is shown in FIG. 8 which is a sectional side view of a gas-insulated electrical device 1 according to a fifth embodiment of the invention, in a case where the high-voltage conductor 3 is provided with an insulation covering layer 7 that readily gives rise to contact electrification with metal, charges are exchanged between the metal foreign matter 6 in contact with the high-voltage conductor 3 and the covering layer 7 and an imaging force to attract the metal foreign matter 6 toward the high-voltage conductor 3 acts on the metal foreign matter 6. Hence, the metal foreign matter 6 is attracted and lies flat on the covering layer 7. In a case where the metal foreign matter 6 lies flat on the covering layer 7, an electric field at the tip end of the metal foreign matter 6 becomes lower than an electric field developed in a case where the metal foreign matter 6 moves in the vicinity of the high-voltage conductor 3 when no film is provided to the high-voltage conductor 3. Hence, withstand voltage performance is enhanced.

The covering layer 7 provided to the high-voltage conductor 3 can be made of a material that gives rise to contact electrification with the metal foreign matter 6, that is, a material on either a positive or negative side from the metal foreign matter 6 in the triboelectric series. It should be noted, however, that in a case where the high-voltage conductor 3 is charged to a negative polarity, the metal foreign matter 6 becomes positively charged when the covering layer 7 is on the negative side and an electrostatic force is generated between the metal foreign matter 6 and the high-voltage conductor 3 in addition to an imaging force. An attraction force is thus increased and the metal foreign matter 6 more readily lies flat. When the covering layer 7 is on the positive side, a generated electrostatic force acts as a repulsion force. Hence, the metal foreign matter 6 is not attracted to the covering layer 7 and falls off from the high-voltage conductor 3.

In a case where the covering layer 7 is provided to the high-voltage conductor 3 as above, insulation performance can be enhanced even when the metal foreign matter 6 floats toward the high-voltage conductor 3 by letting the metal foreign matter 6 become electrically charged upon contact with the covering layer 7.

It should be appreciated that the respective embodiments of the invention can be combined without any restriction within the scope of the invention and the respective embodiments can be modified and omitted as needed.

The invention claimed is:
1. A gas-insulated electrical device comprising:
   a conductor to which a high voltage is applied;
   an airtight container filled with an insulation gas and made of metal to enclose the conductor;
   a covering film covering an inner surface of the airtight container; and
   an insulation gas layer made of the insulation gas and disposed between the conductor and the covering film, wherein
   the covering film is made of a single material and becomes more positively charged than metals in a triboelectric series, and
   the covering film becomes positively charged upon contact with metal foreign matter in the airtight container whereas the metal foreign matter becomes negatively charged upon contact with the covering film.

2. The gas-insulated electrical device according to claim 1, wherein when the conductor is charged to a negative polarity, a Coulomb's force acts on the metal foreign matter in contact with the covering film in the airtight container in a direction away from the conductor.

3. The gas-insulated electrical device according to claim 1, wherein the covering film is made of a material that becomes more positively charged than the metal forming the airtight container among the metals in the triboelectric series.

4. The gas-insulated electrical device according to claim 1, wherein the covering film is made of a material that becomes more positively charged than either lead, aluminum, steel, copper, nickel, silver, gold or platinum in the triboelectric series.

5. The gas-insulated electrical device according to claim 1, wherein an insulation material making the covering film has volume resistivity high enough to reduce charges given to metal foreign matter in the airtight container by a leak current from a bottom surface of the airtight container.

6. The gas-insulated electrical device according to claim 1, further comprising:
an insulation covering layer covering the conductor,
wherein metal foreign matter in the airtight container gives rise to contact electrification upon contact with the insulation covering layer.

7. The gas-insulated electrical device according to claim 1, wherein the covering film is made of rayon, nylon or polymethylmethacrylate.

8. The gas-insulated electrical device according to claim 1, wherein a thickness of the covering film is 200 µm or less.

* * * * *